(12) United States Patent
Zeppei

(10) Patent No.: US 9,638,210 B2
(45) Date of Patent: May 2, 2017

(54) ROLLING BEARING ARRANGEMENT OF A SHAFT OF AN EXHAUST-GAS TURBOCHARGER

(75) Inventor: Dieter Zeppei, Goennheim (DE)

(73) Assignee: BorgWarner Inc., Auburn Hills, MI (US)

( * ) Notice: Subject to any disclaimer, the term of this patent is extended or adjusted under 35 U.S.C. 154(b) by 597 days.

(21) Appl. No.: 14/235,567

(22) PCT Filed: Aug. 2, 2012

(86) PCT No.: PCT/US2012/049251
§ 371 (c)(1),
(2), (4) Date: Jan. 28, 2014

(87) PCT Pub. No.: WO2013/022684
PCT Pub. Date: Feb. 14, 2013

(65) Prior Publication Data
US 2014/0161599 A1    Jun. 12, 2014

(30) Foreign Application Priority Data

Aug. 9, 2011    (DE) .................. 10 2011 109 758

(51) Int. Cl.
*F04D 29/40*    (2006.01)
*F01D 25/16*    (2006.01)
(Continued)

(52) U.S. Cl.
CPC ........... *F04D 29/40* (2013.01); *F01D 25/162* (2013.01); *F01D 25/18* (2013.01); *F16C 19/548* (2013.01);
(Continued)

(58) Field of Classification Search
CPC ........ F01D 25/162; F01D 25/18; F04D 29/40; F05D 2220/40; F05D 2230/642;
(Continued)

(56) References Cited

U.S. PATENT DOCUMENTS 4,676,667 A * 6/1987 Komatsu ................. F01D 25/16
384/517
4,721,398 A * 1/1988 Miyashita ............. F01D 25/164
384/466
(Continued)

FOREIGN PATENT DOCUMENTS

WO    2006095361 A1    9/2006

OTHER PUBLICATIONS

International Search Report PCT/US2012/049251, Jan. 3, 2013.

*Primary Examiner* — Igor Kershteyn
(74) *Attorney, Agent, or Firm* — A. Michael Tucker; Stephan A. Pendorf; Patent Central LLC

(57) ABSTRACT

A rolling bearing arrangement (1) of a shaft (2) of an exhaust-gas turbocharger (3) having two spaced-apart rolling bearings (4, 5), the inner rings (6, 7) of which are arranged on the shaft (2) and between which (6, 7) is arranged a spacer (8), and the outer rings (9, 10) of which are seated in a bearing bushing (12) which is fastened in a bearing housing (11); and having an oil supply device (13) arranged in the bearing housing (11), which oil supply device is flow-connected to an oil supply duct (14A, 14B) which is arranged in the bearing bushing (12) and which opens into an annular chamber (15). A check valve (16) is arranged in the oil supply duct (14A, 14B).

6 Claims, 3 Drawing Sheets

(51) Int. Cl.
  *F01D 25/18* (2006.01)
  *F16C 33/66* (2006.01)
  *F16C 25/06* (2006.01)
  *F16C 19/54* (2006.01)
  *F02B 39/14* (2006.01)
  *F16C 19/16* (2006.01)

(52) U.S. Cl.
  CPC .......... *F16C 25/06* (2013.01); *F16C 33/6659* (2013.01); *F02B 39/14* (2013.01); *F05D 2220/40* (2013.01); *F05D 2230/642* (2013.01); *F05D 2240/54* (2013.01); *F05D 2260/30* (2013.01); *F16C 19/163* (2013.01); *F16C 2360/24* (2013.01)

(58) Field of Classification Search
  CPC ............. F05D 2260/30; F05D 2240/54; F16C 19/548; F16C 19/38; F16C 33/6659; F16C 25/06; F16C 2360/24; F02B 39/14
  See application file for complete search history.

(56) References Cited

U.S. PATENT DOCUMENTS

| | | | |
|---|---|---|---|
| 4,789,253 A | | 12/1988 | Perego |
| 5,076,766 A | * | 12/1991 | Gutknecht ............ F01D 25/164 |
| | | | 184/6.11 |
| 5,246,352 A | * | 9/1993 | Kawakami ............ F01D 25/164 |
| | | | 384/901 |
| 6,877,901 B2 | * | 4/2005 | Wollenweber ........ F01D 25/164 |
| | | | 384/535 |
| 7,025,579 B2 | * | 4/2006 | Woollenweber ........ F01D 15/10 |
| | | | 384/490 |
| 7,793,499 B2 | | 9/2010 | Gutknecht |
| 2009/0242330 A1 | | 10/2009 | Shimomura |

* cited by examiner

ROLLING BEARING ARRANGEMENT OF A SHAFT OF AN EXHAUST-GAS TURBOCHARGER

BACKGROUND OF THE INVENTION

Field of the Invention

The invention relates to a rolling bearing arrangement of a shaft of an exhaust-gas turbocharger, and to an exhaust-gas turbocharger.

Description of the Related Art

For the mounting of a very fast-rotating spindle bearing arrangement, in particular that of an exhaust-gas turbocharger with rolling bearings, it has proven to be advantageous for said rolling bearings to be designed as preloaded angular-contact ball bearings. The preload may be fixedly set by means of a pairing of the components during production. Alternatively, the preload may be generated by means of at least one spring-loaded, displaceable outer ring which compensates thermally induced changes in length, as described for example in DE 10 2007 013 727 A1.

The occurring axial forces vary significantly in direction and magnitude during dynamic operation on the internal combustion engine. Here, the spring forces may be overcome such that axial play arises, which causes noise and wear at the unloaded point.

To overcome said disadvantages, DE 38 01 590 C2, which describes a generic bearing arrangement, describes a hydraulic preload which is realized by means of an axially symmetrical oil-filled annular chamber.

BRIEF SUMMARY OF THE INVENTION

It is an object of the present invention to provide a rolling bearing arrangement, which rolling bearing arrangement makes it possible to compensate a thermally induced or load-induced axial play.

By means of the provision, according to the invention, of a check valve which closes off the annular chamber, it is possible for the components of the rolling bearing arrangement according to the invention to be designed such that the quasi-static preload forces and therefore the bearing friction losses are minimized.

Since the oil cannot be forced out of the annular chamber, the dynamically occurring force fluctuations are borne by the oil.

There is furthermore the resulting advantage that a thermally induced or load-induced axial play can no longer arise in the rolling bearing arrangement according to the invention, and noises and wear on the unloaded side of the rolling bearing arrangement cannot arise.

BRIEF DESCRIPTION OF THE SEVERAL VIEWS OF THE DRAWINGS

Further details, features and advantages of the invention will emerge from the following description of exemplary embodiments on the basis of the drawing, in which.

DETAILED DESCRIPTION OF THE INVENTION

Figure 1:
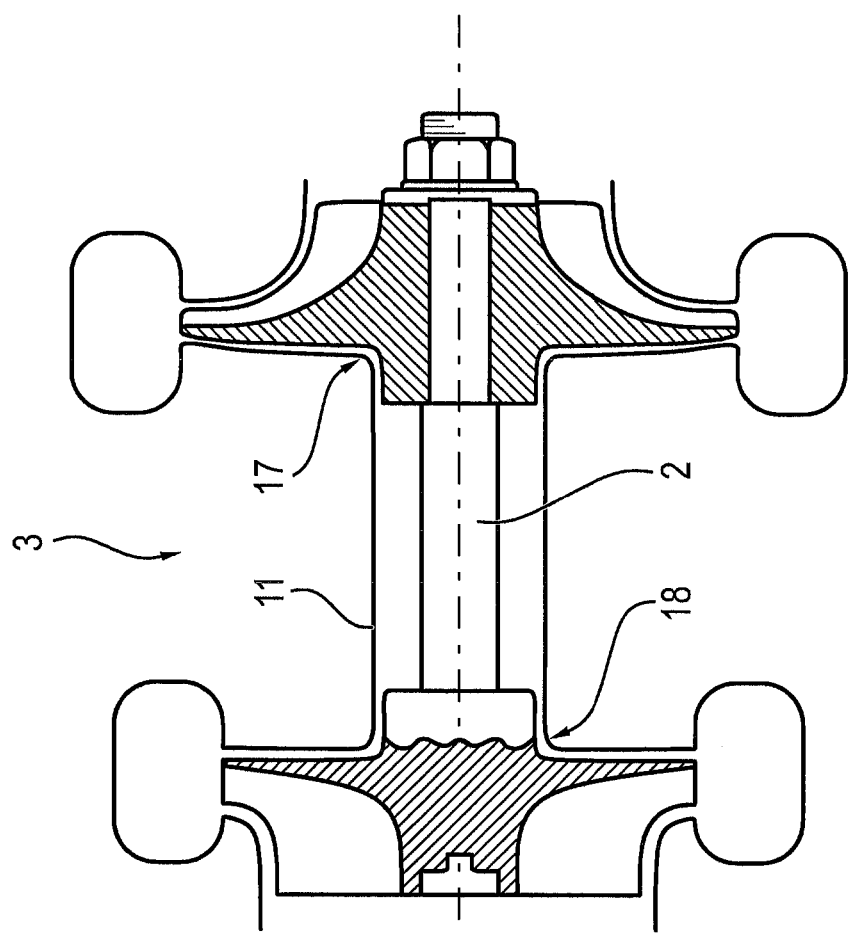
FIG. 1 shows a schematically highly simplified illustration of an exhaust-gas turbocharger according to the invention.
Figure 2:
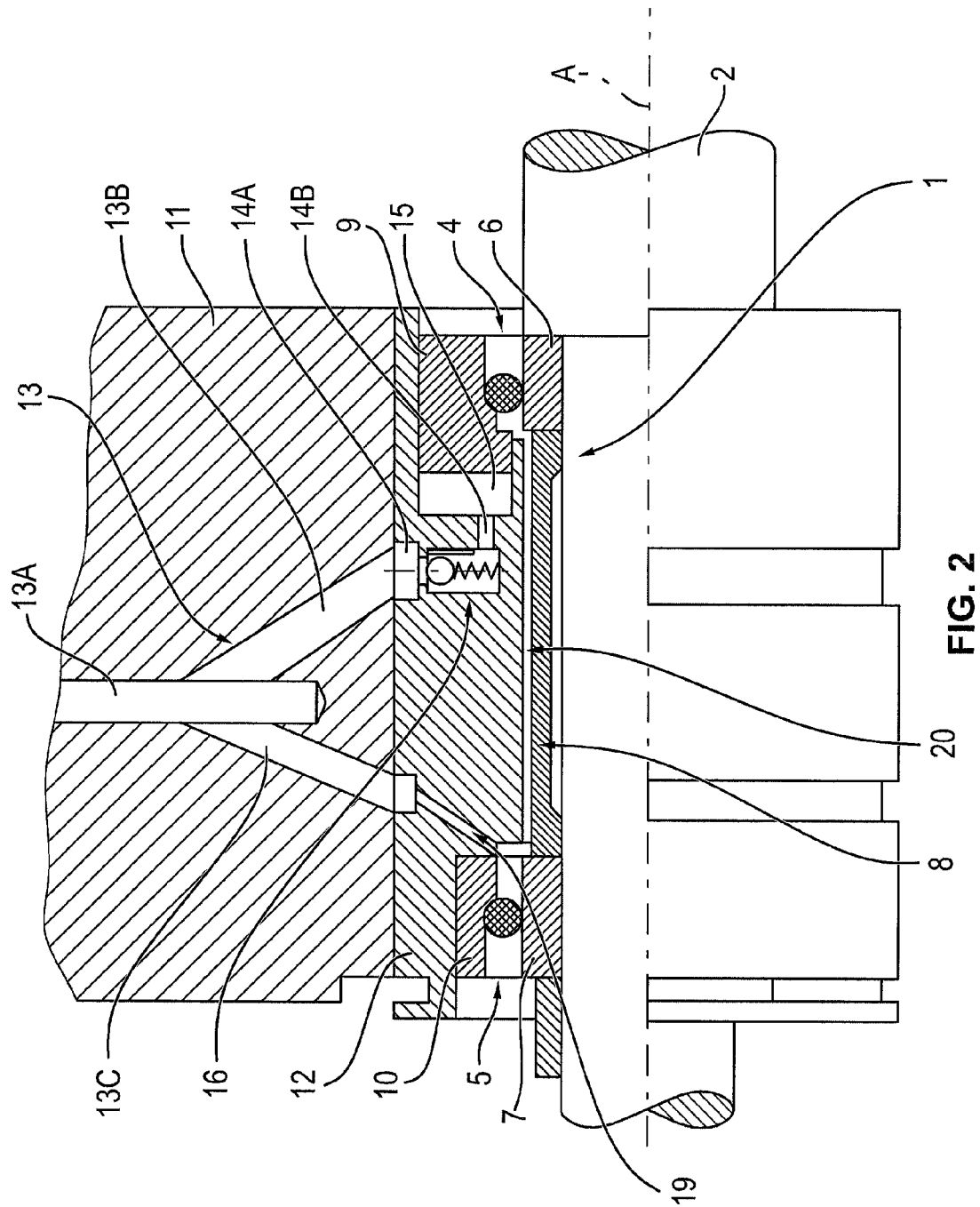
FIG. 2 shows a sectional illustration through a part of the bearing housing with a first embodiment of the rolling bearing arrangement according to the invention.
Figure 3:
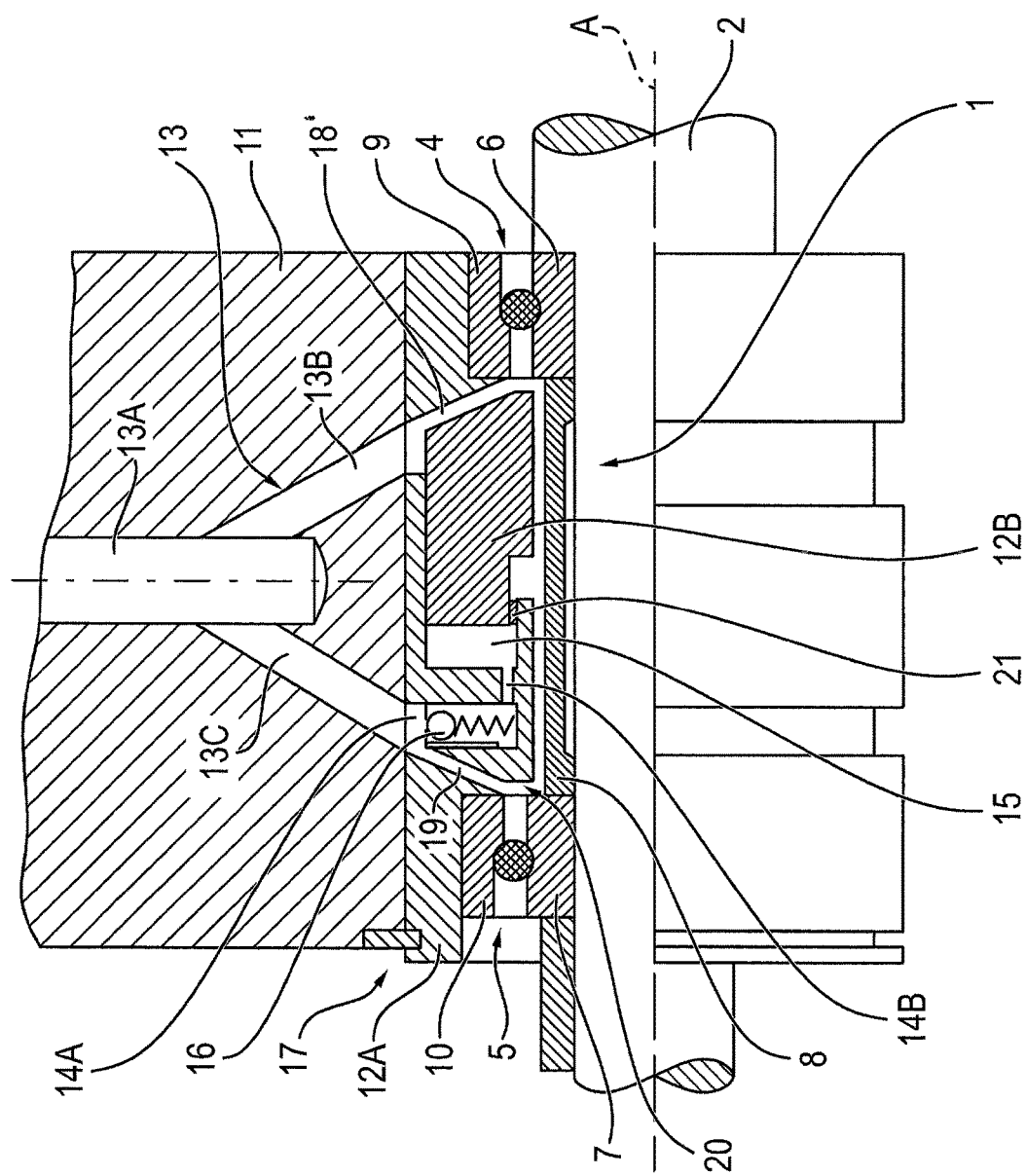
FIG. 3 shows an illustration, corresponding to FIG. 2, of a second embodiment of the rolling bearing arrangement according to the invention.

FIG. 1 shows, in schematically highly simplified form, an exhaust-gas turbocharger 3 according to the invention which, as is conventional, has a compressor 18, a turbine 17 and a bearing housing 11, which bearing housing is arranged between the compressor 18 and the turbine 17 and serves for mounting a shaft 2, said shaft being provided with the compressor wheel and the turbine wheel in its respective end regions and being mounted by means of a rolling bearing arrangement which is arranged in the bearing housing 11 and which will be explained in detail on the basis of the following FIGS. 2 and 3.

FIG. 2 shows a first embodiment of the rolling bearing arrangement 1 according to the invention which, as stated, serves for mounting the shaft 2 of the exhaust-gas turbocharger 3 in the bearing housing 11.

The rolling bearing arrangement 1 has two spaced-apart rolling bearings 4 and 5 which are preferably in the form of angular-contact ball bearings.

The inner ring 6 of the rolling bearing 4 and the inner ring 7 of the rolling bearing 5 are arranged on the shaft 2, wherein a spacer 8 which is likewise arranged on the shaft 2 serves to hold the two inner rings 6 and 7 at a distance from one another.

The outer rings 9 and 10 of the rolling bearings 4 and 5 are arranged in a bearing bushing 12 which in turn is fixed in bearing housing 11.

The bearing housing 11 is provided with an oil supply device 13 which, in the illustrated example, has a central supply duct 13A and two oil ducts 13B and 13C which branch off from said central supply duct. The oil duct 13C is flow-connected to an oil duct 19 which runs in the bearing bushing 12 and which supplies oil both to the rolling bearing 5 and also to the rolling bearing 4 via an annular duct 20 for the lubrication of said rolling bearings.

The oil line 13B is flow-connected to an oil supply duct which is likewise arranged in the bearing bushing 12. In the example illustrated, the oil supply duct has a first duct portion 14A, which runs at least substantially perpendicular to the axis A of the shaft 2, and a duct portion 14B which adjoins the first duct portion and which runs at least substantially parallel to the axis A. It would alternatively also be possible for the oil supply duct to have only one duct portion.

The oil supply duct 14A, 14B connects the oil supply device 13 via its portion 13B to an annular chamber 15 which, in the illustrated embodiment as per FIG. 2, is arranged directly adjacent to the outer ring 9 of the rolling bearing 4.

As is also shown in FIG. 2, a check valve 16 is arranged in the oil supply duct, in the duct portion 14A in the example illustrated, which check valve permits a supply of oil into the annular chamber 15 but closes off the latter such that the oil cannot flow back from the annular chamber 15 into the oil supply device 13. This yields the advantages, described in the introduction, of the rolling bearing arrangement according to the invention over the prior art described in the introduction.

The second embodiment as per FIG. 3 has a bearing bushing 12 which, in contrast to the embodiment as per FIG. 2, is divided into two bushing parts 12A and 12B. In the illustrated embodiment, the bushing part 12A is fixed in the bearing housing 11 whereas the second bushing part 12B is guided so as to be displaceable relative to the first bushing part 12A in the axial direction A of the shaft 2. A seal 17 is provided between the two bushing parts 12A and 12B for sealing purposes.

As shown in FIG. 3, in this embodiment, the annular chamber 15 is situated between the bushing parts 12A and 12B, such that the oil pressure built up in the annular chamber 15 acts indirectly on the first ring 9 of the rolling bearing 4, because the oil pressure built up in the annular chamber 15 causes the second, displaceable bushing part 12B to be displaced in the direction of the rolling bearing 4, such that the axial play compensation explained in the introduction, with the associated advantages over the prior art, is possible with this embodiment too.

In the embodiment illustrated in FIG. 3, for the supply of oil to the axial bearing 4, a duct 18' is provided in the second bushing part 12B, which duct is flow-connected to the duct portion 13B of the oil supply device 13.

For the supply of oil to the rolling bearing 5, there is also provided an oil duct 19 which branches off from the oil supply duct portion 14A, such that the oil supplied through the duct portion 13C can supply oil to both said duct 19 and also the annular chamber 15.

The embodiment as per FIG. 3 otherwise corresponds to that of FIG. 2, such that identical reference symbols have been used, and reference may be made to the above description of FIG. 2.

In addition to the written disclosure above, reference is hereby made explicitly to the diagrammatic illustration thereof in FIGS. 1 to 3.

LIST OF REFERENCE SYMBOLS

1 Rolling bearing arrangement
2 Shaft
3 Exhaust-gas turbocharger
4, 5 Rolling bearings
6, 7 Inner rings
8 Spacer
9, 10 Outer rings
11 Bearing housing
12 Bearing bushing
13, 13A, 13C Oil supply device
14A, 14B Oil supply duct
15 Annular chamber
16 Check valve
17 Turbine
18 Compressor
18' Duct
19 Oil duct
20 Annular duct
21 Seal
A Axis of the shaft 2

The invention claimed is:

1. A rolling bearing arrangement (1) of a shaft (2) of an exhaust-gas turbocharger (3) having
two spaced-apart rolling bearings (4, 5),
the inner rings (6, 7) of which are arranged on the shaft (2) and between which (6, 7) is arranged a spacer (8), and
the outer rings (9, 10) of which are seated in a bearing bushing (12) which is fastened in a bearing housing (11); and
an oil supply device (13) arranged in the bearing housing (11), which oil supply device is flow-connected to an oil supply duct (14A, 14B) which is arranged in the bearing bushing (12) and which opens into an annular chamber (15),
wherein
a check valve (16) is arranged in the oil supply duct (14A, 14B), and
the annular chamber (15) is arranged directly adjacent to the outer ring (9) of one (4) of the two rolling bearings (4, 5).

2. A rolling bearing arrangement (1) of a shaft (2) of an exhaust-gas turbocharger (3) having
two spaced-apart rolling bearings (4, 5),
the inner rings (6, 7) of which are arranged on the shaft (2) and between which (6, 7) is arranged a spacer (8), and
the outer rings (9, 10) of which are seated in a bearing bushing (12) which is fastened in a bearing housing (11); and
an oil supply device (13) arranged in the bearing housing (11), which oil supply device is flow-connected to an oil supply duct (14A, 14B) which is arranged in the bearing bushing (12) and which opens into an annular chamber (15),
wherein
a check valve (16) is arranged in the oil supply duct (14A, 14B), and
the bearing bushing (12) is divided into two bushing parts (12A, 12B), wherein a first bushing part (12A) is fixed in the bearing housing (11) and a second bushing part (12B) is guided so as to be displaceable relative to the first bushing part (12A) in the axial direction (A) of the shaft (2), and wherein the annular chamber (15) is arranged between the first and the second bushing part (12A, 12B).

3. The rolling bearing arrangement as claimed in claim 2, wherein a seal (21) is arranged between the bushing parts (12A, 12B).

4. An exhaust-gas turbocharger (3) having
a bearing housing (11); and
a rolling bearing arrangement (1) which has two spaced-apart rolling bearings (4, 5), the inner rings (6, 7) of which are arranged on a shaft (2) and between which (6, 7) is arranged a spacer (8), wherein the outer rings (9, 10) of the rolling bearings (4, 5) are seated in a bearing bushing (12) which is fastened in the bearing housing (11);
wherein an oil supply device (13) is arranged in the bearing housing (11), which oil supply device is flow-connected to an oil supply duct (14A, 14B) which is arranged in the bearing bushing (12) and which opens into an annular chamber (15),
wherein a check valve (16) is arranged in the oil supply duct (14A, 14B), and
wherein the annular chamber (15) is arranged directly adjacent to the outer ring (9) of one (4) of the two rolling bearings (4, 5).

5. An exhaust-gas turbocharger (3) having
a bearing housing (11); and
a rolling bearing arrangement (1) which has two spaced-apart rolling bearings (4, 5), the inner rings (6, 7) of which are arranged on a shaft (2) and between which (6, 7) is arranged a spacer (8), wherein the outer rings (9, 10) of the rolling bearings (4, 5) are seated in a bearing bushing (12) which is fastened in the bearing housing (11);
wherein an oil supply device (13) is arranged in the bearing housing (11), which oil supply device is flow-connected to an oil supply duct (14A, 14B) which is arranged in the bearing bushing (12) and which opens into an annular chamber (15), wherein a check valve (16) is arranged in the oil supply duct (14A, 14B), and wherein the bearing bushing (12) is divided into two bushing parts (12A, 12B), wherein a first bushing part (12A) is fixed in the bearing housing (11) and a second bushing part (12B) is guided so as to be displaceable relative to the first bushing part (12A) in the axial direction (A) of the shaft (2), and wherein the annular chamber (15) is arranged between the first and the second bushing part (12A, 12B).

6. The rolling bearing arrangement as claimed in claim 5, wherein a seal (21) is arranged between the bushing parts (12A, 12B).

\* \* \* \* \*